ABSTRACT OF THE DISCLOSURE

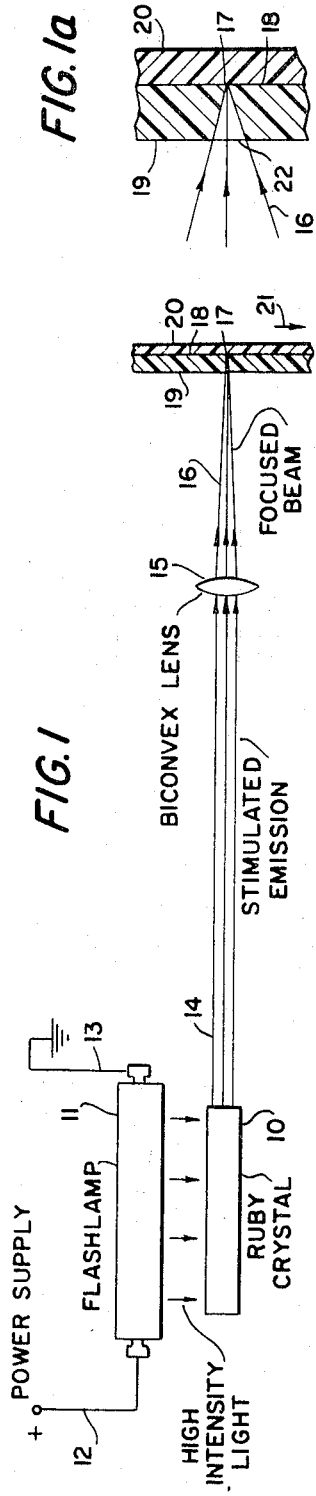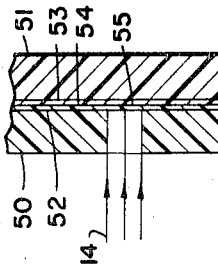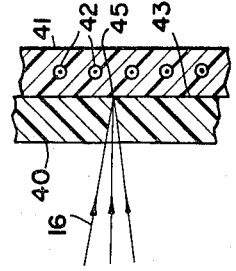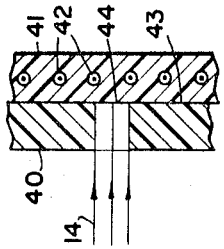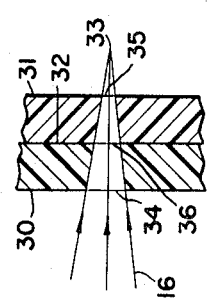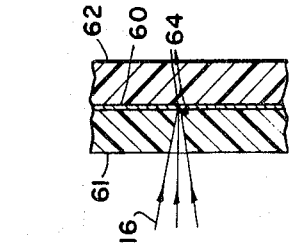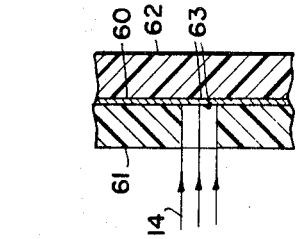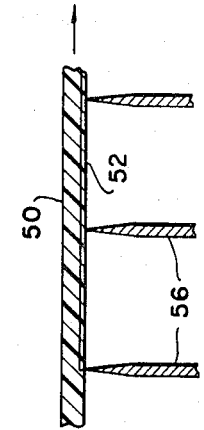
INVENTORS
ANDREW J. FOGLIA
ARNOLD F. STANCELL
GEORGE BRECHT 3,560,291
BONDING THERMOPLASTIC RESIN FILMS
BY MEANS OF RADIATION FROM A LASER
SOURCE
Andrew J. Foglia, Brooklyn, N.Y., and Arnold F. Stancell, New Brunswick, and George Brecht, Metuchen, N.J., assignors to Mobil Oil Corporation, a corporation of New York
Filed Mar. 27, 1964, Ser. No. 355,215
Int. Cl. B29c 27/04; B32b 31/26
U.S. Cl. 156—229      2 Claims

A method for bonding two structures of thermoplastic material which comprises bringing the structures together so that they are in mating contact, and subsequently irradiating the pressed together thermoplastic structures by placing the same in the path of high energy electromagnetic radiation, such as a pulsed laser beam for example, to effect softening of the interface whereby said structures are bonded together.

---

This invention relates to the bonding of thermoplastic structures, particularly films, sheets, strips and the like, by means of stimulated radiation.

A commonly used practice of bonding thermoplastic films, such as those of polyolefins like polyethylene, comprises bringing the contiguous films between the plates of a heated clamp and applying pressure. Or a heated rotatable disc may be rolled over the films and pressure applied to melt an area which upon cooling forms a continuous bond between the films. More recently, ultrasonic energy has been used to form bonds, using ultrasonically excited, rather than thermally heated, metal probes. In these methods a certain minimum temperature, pressure, and dwell time are required to bond a pair of films of given composition and thickness, and control of these variables is therefore necessary. Furthermore, control over the application of heat is required to insure that the film on both sides of the bond, over the entire bond area, is melted. Some films shrink upon heating, and the bonded structure often shows unsightly wrinkling in the bond area. In addition, the heated metal clamp, disc, etc., must fit the shape of the films or other structures to be bonded, and this means that the sealing of highly contoured structures is impracticable.

According to the invention, it is proposed to form polymer-to-polymer bonds between films or other structures using stimulated emission radiation. No metal instruments are employed which create the bond on contact with the films, and thus the problem arising with their use are eliminated. Furthermore, bonding can be achieved with great rapidity; for example, a bond between a pair of suitably disposed polyethylene films can be formed at an interval as low as 0.0005 second, which, as described below, is the duration of a single pulse of radiation. It is possible to create the bond at the interface in which the mating surfaces of the two films lie and thus avoid undesirable melting of the body of the films; in other words, heating of the entire film is avoided. Highly contoured structures may be bonded.

Essentially, the invention comprises bringing together the thermoplastic films or other structures to be bonded so that at least one pair of adjacent surfaces thereof are in mating or intimate contact, these surfaces thus forming an interface. The structures are pressed together or otherwise maintained in contact and irradiated for a time sufficient to effect softening or fusion at the interface by placing them in the path of electromagnetic radiation whose constituent waves or rays are all in phase and all have the same wave length. The wave length may be in the range of about 0.5 to 0.6 to about 28 or 30 or more microns. The radiation has a high energy content ranging from a fraction of a joule to about 50 or 100 or more joules. There is absorbed in the interface a quantity of energy sufficient to bond together the mating surfaces.

Considering the invention in detail, the structures that may be bonded are preferably thin films, sheets, webs, fabric, strips, strands and the like and may or may not be coated. Preferably they have a thickness in the range of 0.5 to 10 or 20 mils. Greater thicknesses are possible, depending on the energy per unit area that is available from the radiation source, greater energies being useful for thicker structures, and vice versa. With the source described in the examples, thicknesses in the range of about 10 to 75 mils are suitable. Over all, however, structures having a thickness of up to 10 inches can be bonded. It will be understood that a pair of bonded structures may have the same or different thicknesses. Denser structures or plastics favor greater absorption of the radiation, and vice versa. As indicated, non-flat structures such as die cast or injection molded products may be bonded.

Besides providing bonds, the invention is of value to form laminates from sheet materials. Tubular forms may be made from individual sheets, as by bringing one longitudinal edge portion of a sheet over to the opposite edge portion to overlap the two, thus forming a loop or tube. A further application comprises bonding a thermoplastic film, sheet or other structure to an embossed or printed web such as paper, then peeling or separating one from the other, thus forming the embossing or printing on the plastic sheet.

The preferred structure for the practice of the invention comprises films, and the ensuing description relates specifically to films although it will be understood that they are illustrative.

Three general embodiments may be described, one relating to unchanged or untreated films, one to pretreated films in which the entire film undergoes a change, and one to pretreated films in which the treatment or change may be considered for purposes of the invention as affecting a surface only of the film. Each embodiment may include modifications.

In one embodiment, two untreated thermoplastic films in the as-formed state may be bonded together. The overlapped area of the contiguous films is placed in the path of the radiation so that the plane of such area is perpendicular to the longitudinal axis of the radiation. As set forth in greater detail below, the radiation is provided by a laser device and may be in the form of a pulsed or continuous radiation or beam. The beam may be focused or not, and by relatively moving the laser source with respect to the film, the interface of the film may be brought into operative relation with respect to the beam. Focusing, when used, may be done by means of a suitable lens or mirror system. For bonding a pair of untreated films it is advantageous, particularly with a laser source of the type described in the examples, to employ a focused beam to obtain the increased intensity and selectivity that focusing provides.

A second embodiment comprises bonding an untreated film with a pretreated film wherein the pretreatment comprises stretching the film in one direction. Stretching involves a change in the entire film, for as is known, it orients the polymer molecules or chains in the direction of the axis of stretch. When bonded to an untreated film, the stretched film, when disposed away or remote from the energy source, may help form an interface having an enhanced capacity to absorb radiation as well as a capacity to absorb it selectively. This effect may be described further as follows. For certain laser devices, such as the one described in the examples, the output beam is plane polarized, and for at least some other devices it can be rendered plane polarized. As illustrated in Example 3, it is found that the absorption selectivity is enhanced when a plane-polarized beam is applied to a stretched film in such a way that the plane of polarization is perpendicular to the axis or direction of stretch. Apparently an increased interaction between the beam and the stretched film occurs as a result of the described application of the beam, and this effect is not obtained if the polarization plane is parallel to the stretch direction, or if the film is not stretched.

The third embodiment relates to films in which the pretreatment may be regarded as affecting the surface of a film and thus enhancing the absorption of an interface in which such surface lies. According to this embodiment a selectively absorbing layer is created or formed or disposed between a pair of films or other structures to be bonded. Several modifications are apparent in one of which the surface of a film is pretreated by mechanically stressing the same, as by drawing the film across and in contact with a knife edge, without however cutting the same. The film may be bonded to another stressed or unstressed film, taking care to dispose the stressed surfaces in the interface.

In another modification, an untreated film may be treated to increase its surface polarity and then bonded to an untreated film. It is found that such pretreatment of a film has the effect of enabling it to selectively absorb the radiation, leading to an improved and/or more rapidly formed bond. Illustrative of this embodiment is a film whose surface has been exposed to an electric discharge in ammonia gas for a time sufficient to increase the polarity of the surface. When such surface is mated with a like surface, or with a surface of an untreated film, the resulting interface has an enhanced capacity for absorbing the radiation, and production of a good bond is favored. Of interest in this connection is an experiment in which eight strips of polyethylene film were treated on one side by electric discharge in ammonia gas, after which the strips were stacked with the treated surfaces of each pair of contiguous strips in contact. On irradiation of the stack with a pulsed laser beam (pulse of 0.5 millisecond duration) directed at one side of the stack, bonds were formed only at the treated surfaces of each contiguous pair of strips. Besides ammonia, vapors of other polar compounds may be used in the electric discharge step, including halogenated hydrocarbons like chloroform; alkyl and alkenyl halides like vinyl chloride; saturated and unsaturated aliphatic acids like vinyl acetic acid, crotonic acid, butyric acid, and the like. Other procedures for increasing the polarity of a surface include treating it with such polarity increasing polar compounds as chromic acid (chromic trioxide in sulfuric acid), chlorine, permanganic acid, etc. It will be understood that after treatment of a surface with one of the foregoing agents, any excess agent is removed prior to irradiation. Another procedure comprises flame treating the surface. The laser beam itself may be used to pretreat a surface to increase its polarity.

A further modification comprises coating the surface of an untreated film with a distinct separately added layer of a polar compound, such as those described in the preceding embodiment, and then bonding the treated film to an untreated one. The amount of compound applied to a surface is sufficient to form a distinct layer. Gaseous polar compounds can be trapped between a pair of films to form a layer. Of further advantage is the use of a layer comprising a polymerizable material, such as a monomer, dimer, or oligomer, which is sandwiched between a pair of films or other structures; preferably the monomer is liquid and, when polymerized by the action of the beam, is compatible with the material of the structures. The monomer, dimer, etc. may form a thermoplastic or, provided it is in a heat fusible stage, a thermoset; after it is polymerized it forms a bond between the films. Use of a monomer, etc. in this way may provide a seal created by fusion and/or by chemical action.

A further modification of interest makes use of three films comprising a central pretreated film sandwiched between two outer untreated films. Two interfaces may thus be established. The central film may be an oriented one, or it may have surface polarity on both sides, or a layer of polar compound on both sides, or a coating of a monomer, etc. on both sides.

In addition to the foregoing embodiments, it will be understood that other embodiments are suitable wherein any of the above described pretreated films may be bonded to any other pretreated film, whether similar or dissimilar. For example, a film pretreated to increase its surface polarity may be bonded with a like film or with a film pretreated by stretching. Similarly, an oriented film may be bonded with one of the other pretreated films. And so on. It will be understood, of course, that the interface of such pairs of films will comprise mating surfaces one or both of which have been pretreated.

All thermoplastic resins are operative for the process of the invention. Thus, for example, vinyl acetate copolymers, vinyl chloride copolymers or a mixture of the two, chlorinated rubbers, styrene polymers and copolyers, cellulose acetate, cellulose acetate butyrate, cellulose acetate propionate, methyl cellulose, vinyl butyrate, polyethylene, polypropylene and other polyolefins, butadiene copolymers such as butadiene acrylonitrile and butadiene styrene copolymers, polymethyl methacrylate, vinyl acetate polymers, vinyl chloride-vinylident chloride copolymer, and mixtures of these substances are satisfactory.

The stimulated radiation, as indicated, is the radiation emitted by a laser. Such radiation is also referred to as laser energy, and as indicated, it comprises electromagnetic radiation whose constituent waves or rays are all in phase and all of which have the same wave length. The waves are described as highly coherent, by which is meant that there is a high degree of correlation between their phases, or that they are substantially in phase; and they are described as monochromatic, by which is meant that they have very nearly the same wave length; and they are further described as well collimated, referring to the fact that they are highly parallel. For all practical purposes the waves are to be regarded as in phase and as having the same wave length. As noted, the radiation emitted by a particular laser device may be plane polarized, and if not, it is at least in some cases capable of being plane polarized. The wave length is broadly in the range of about 0.2 to about 30 or 40 microns, and preferably in the range of about 0.4 to 0.8 micron which corresponds to the visible region of the electromagnetic spectrum The frequency corresponding to the broad range of wave length ranges from $1.5 \times 10^{15}$ down to $0.1 \times 10^{15}$ or $0.0075 \times 10^{15}$ cycles per second. The radiation is further characterized by having an energy content ranging from a fraction of a joule to about 1000 joules and even higher.

Each laser material emits its light in a specific wave length, i.e., at or near the natural frequency of its particular atomic structure. Thus, one laser device produces a beam having a particular well-defined frequency, while another employing a different material produces a beam having a different, but also well-defined, frequency. The wave length, frequency, and power of the radiation are thus variable by selecting an appropriate device, a number of which are available. When a conjugated organic molecule is employed to supply the laser beam, a variation in the foregoing characteristics may be had by suitable choice of the organic compound. It is also possible to produce varying frequencies by beating one frequency against another to produce a frequency difference from the other two, and in this way it may be possible to synthesize wave lengths, so to speak. Also, a beam from a continuous wave source may be varied in frequency using suitable electronic means known in the art.

The radiation may be pulsed or in the form of a continuous wave. Pulses have been recorded as short as 20 nanoseconds and as long as 1 millisecond. Appropriate devices are available for producing either type of radiation.

Several types of laser devices are known, including solid state light-pumped lasers such as ruby or glass; gaseous lasers such as helium-neon; semiconductor lasers such as gallium arsenide; lasers employing conjugated organic molecules such as benzene, toluene, or naphthalene; and plastic lasers such as polymethyl methacrylate containing traces of an europium chelate. The following list presents a partial list of devices.

lamp, the ruby is excited to produce a pulsed parallel beam, or stimulated emission, shown at 14 which passes through a biconvex lens 15. The beam at 16 is focused to form a small area or spot 17 on the planar interface 18 of the contiguous thermoplastic films 19 and 20, the interface being disposed perpendicularly to the axis of the beam. Films 19 and 20 are clear untreated films made of a plastic such as polyethylene. A seal or bonded area is formed at 17 as the result of fusion of the plastic at that area. It will be understood that as the contiguous films move in the direction of arrow 21, a succession of bonded areas will be formed by successive pulses of the beam.

CHARACTERISTICS OF SOME LASERS

| No. | Type | Active centers | Duration | Temperature | Approximate wavelength, angstroms |
|---|---|---|---|---|---|
| 1 | Gas | Neon | CW | Room | 11,530 |
| 2 | Gas | do | CW | do | 6,328 |
| 3 | Ruby | Cr$^{+++}$ ions | Millisec | do | 6,943 |
| 4 | CaWO$_4$ | Nd$^{+++}$ ions | CW | 77 K | 10,630 |
| 5 | Gas | Cs | CW | Room | 71,500 |
| 6 | Semiconductor | GaAs | Pulsed | 77 K | 8,400 |
| 7 | CaF$_2$ | Dy$^{++}$ | CW (sun pumped) | | 23,900 |
| 8 | CaF$_2$ | U$^{+++}$ | Pulsed | | 25,000 |
| 9 | CaF$_2$ | Sm$^{++}$ | do | | 7,082 |
| 10 | BaF$_2$ | U$^{+++}$ | | | 27,000 |
| 11 | Fused quartz | Silicon | Pulsed | Room | 2,541–4,130 |
| 12 | Glass | Gd$^{+++}$ | do | do | 3,125 |
| 13 | Alcohol | Eu-dibenzoylmethide | do | −120°C. or lower | 6,121 / 6,152 / 6,154 |
| 14 | Plastic | Eu-chelate | do | | 6,130 |

In general, the method of the invention comprises superposing one thermoplastic structure, such as a film, on another so that a surface of each film is in contact with a surface of the other to form an interface, pressing the structures together by suitable means, such as a clamp, glass plates, a pair of contact rollers between which the film passes, or by the weight of one of the structures, and then irradiating the film over a desired area with the laser radiation. Preferably, the plane of the interface is disposed perpendicularly to the axis of the beam. If focusing is used, the beam is first passed through an appropriate lens, and the interface of the films is disposed in the path of the focused beam; the latter may be directed at a right angle, or even an acute angle, with respect to the interface, and the focused rays intersect at the interface. A variation comprises directing two or more beams, focused or not, at a right or acute angle with respect to the interface so that the beams intersect at the interface.

Some illustrative applications of the invention are shown in the drawing, which is diagrammatic, and in which:

FIG. 1 shows a laser device and beam in relation to a focusing lens and, in cross section, a partial view of a pair of contiguous films to be sealed;

FIG. 1a shows the films of FIG. 1 in enlarged form;

FIG. 2 shows another pair of films in the path of a focused beam.

FIG. 3 shows a pair of films in the path of an unfocused beam, the remote film having been oriented.

FIG. 4 is like FIG. 3 except that the beam is focused;

FIG. 5 shows a pair of films in the path of the beam wherein mating surfaces of the films have been pretreated to form a selectively absorbing layer.

FIG. 6 is like FIG. 5 except that the beam is focused;

FIG. 7 illustrates a method of pretreating a surface of the film by drawing the same over knife edges;

FIG. 8 is like FIGS. 3 and 5 except that a thin film is interposed between the two films to be bonded; and FIG. 9 is like FIG. 8 but shows a focused beam.

In FIG. 1 a ruby laser is shown comprising a ruby crystal or rod 10 disposed in operative relation to a xenon flash lamp 11, the latter being connected by line 12 to a power supply comprising a bank of capacitors not shown and to a connection 13 leading to ground. Upon firing the Formation of the bonded area at 17 may be considered for a moment in relation to the area at 22, note FIG. 1a, upon which the beam falls and through which it passes. It will be understood that the temperature of area 22 rises, as does the temperature of the area of spot 17, owing to absorption of radiation. As the beam passes through both 22 and 17, the radiation falling on both areas is the same; but since the area at 17 is considerably smaller than at 22, the energy per unit area received at 17 is considerably greater than received at 22. As may be apparent, the beam forms a cone partly defined by the area 22 and the spot 17, with the latter receiving the greatest energy per unit area. In consequence, the temperature at 17 is greater than at 22, and greater than at any other part of the cone; fusion thus takes place at the interface at 17 but not at the area 22. Furthermore, fusion is localized at the interface area 17. Suitable provision is made to insure the latter phenomenon, including the choice of laser device, lens, and thickness of film 19.

It is preferred that the film 19 nearer the laser source shall be thicker than the remote film 18; and while the thickness of film 19 is variable, it is preferably at least ¼ or ½ inch. A desired cone will form when the thickness is at least about ¼ inch. The lower limit of thickness of film 19 is limited only by the availability of a lens of suitable focusing power. It will be understood that the beam 16 continues beyond or to the right of the area 17, diverging therefrom and passing through and beyond film 18. To simplify the drawing, this portion of the beam is not shown.

A modification of FIG. 1 is shown at FIG. 2 where contiguous films 30 and 31, and more particularly the interface 32, are disposed between the focal point at 33 and the laser source, not shown. The films are clear untreated thermoplastic, and as shown, are of substantially the same thickness. As the beam 16 passes through the films, it forms a truncated cone which is partially defined by the area 34, forming the base of the cone, and by the area 35 at the truncation. An area 36 in the interface 32 is apparent. The energy received by area 36 is the same as that received by area 34, but being smaller, the energy per unit area received by 36 is greater than received by 34. Therefore the temperature at 36 is greater, and fusion at this interface area takes place. It will be noted that the resulting bond is over a larger area than in FIG. 1.

In the embodiment of FIG. 3, the unfocused beam 14 impinges on the untreated film 40 of a pair of films 40 and 41, film 40 being near to the laser source and film 41 remote. The remote film is stretched in a direction indicated by the arrow heads 42, which indicate a direction coming through the paper toward the observer. The beam as emitted from the ruby laser is plane polarized, and although not shown in the drawing, the plane of polarization is perpendicular to the direction or orientation of film 41 so that an interaction takes place between the beam and the interface, involving an enhanced absorption of radiation in the interface 43, particularly in the area 44 which is to be bonded, thus raising the temperature of the same and causing fusion with resulant formation of a bond. The beam is shown as falling on the interface to emphasize that selective absorption occurs there, and it will be understood that the beam continues through the film 41. It is apparent that the bond is formed over a fairly large area 44. In place of the untreated film one may also use a film that is stretched, but in which the direction of orientation is different from that of the first film. In other words, what is sought is an interaction between the beam and the interface in which it is desired to form a bond.

The condition of perpendicularity between the plane of polarization of the beam and the direction of orientation of the film may be determined by trial and error, but a preferred method is to employ a polarizer, as described in Example 3.

The modification of FIG. 4 differs from FIG. 3 only in employing a focused beam, resulting in formation of a bond at the spot 45 in the interface 43.

The embodiment of FIG. 5 shows a pair of contiguous films 50, 51 each having a mating surface 52, 53 that has been pretreated to form a selectively absorbing layer or interface 54. Such surface pretreatment may be by any of the techniques previously described. A convenient and rapid pretreatment is to apply a physical stress to the surface, as illustrated in FIG. 7 where the applied stress is a mechanical one. As shown, a film 50 is drawn across a plurality of knife edges 56 to produce a stress in the surface of the film, indicated at 52. Referring back to FIG. 5, the unfocused beam 14 falls on the films and is selectively absorbed by interface 54, comprising the stressed surfaces 52, 53, thus raising the temperature thereof and forming a bond at the area 55.

FIG. 6 is a modification of FIG. 5 in which the beam is focused, a bond being formed at the spot 57.

In FIGS. 5 and 6 the layer or interface 54 can also be formed by means previously described, including treatment of the surfaces of the films with a polarity increasing agent.

FIG. 8 is another modification of FIG. 5 wherein pretreatment of the films or mating surfaces thereof is carried out by interposing a selectively absorbing layer 60 in the form of a thin oriented thermoplastic film. The layer is interposed between a pair of untreated films 61, 62. Beam 14 is unfocused and is selectively absorbed by film 60, resulting in fusion and creation of a bond at the areas 63. Film 60 with the adjacent surfaces of films 61 and 62 constitute the interface.

In place of an oriented thin film 60, which preferably is of the same plastic material as films 61, 62, there can be used an oriented or unoriented, preferably the former, thin film of a different thermoplastic; for example, if films 61 and 62 are polyethylene, film 60 can be polyvinyl chloride, and as can be seen, its thickness is only a fraction of that of films 61 and 62.

FIG. 9 is a modification of FIG. 8 in which a focused beam 16 is used to form a bond at the spots 64.

In FIGS. 8 and 9 it will be understood that the selectively absorbing layer in the form of film 60 may also represent a layer of a polar compound, or a layer of a polymerizable material such as the monomer, dimer etc. previously described.

Referring to focusing this is also a convenient way of increasing the intensity of the beam, making it possible to use devices whose power might otherwise be less than desired. For bonding clear untreated thermoplastic structures, focusing is a preferred procedure, as noted. For example, when bonding clear untreated films of polyolefin with a ruby laser of 0.25 joule power, it is preferred to focus the beam. It will be understood that wherever the power of a given device is insufficient to produce a bond, one may resort to focusing or may use a device of higher power. In general, lower power devices whose output is focused tend to form bonds of smaller area; in some cases substantially line bonds are formed, and these are desirable for a given purpose. For bonds of larger area, say strips about ¼ inch in width, an unfocused laser beam may be desirable, and larger power devices of up to 50 joules are to be preferred. If the power from a given device is so great as to be likely to damage or destroy the structure, suitable precautions are available, such as attenuating the beam by using a filter, or using between the laser source and the plastic structure a partially reflecting mirror which reflects away a part of the beam and transmits only a part to the structure, or choosing a device of lower power.

By suitable choice of lens, it is possible to focus the beam to a small spot having a diameter of a few microns, e.g., on the order of 1 to 5 microns. Even smaller diameters are possible, going down to one wave length, and spots of larger diameters may of course be formed. The appropriate size is determinable beforehand. As may be apparent, a bonded area is formed when the energy per unit area absorbed thereby is sufficient to produce fusion of the interface at the area in question. Such energy per unit area is variable; a suitable amount is about 0.25 joule/ sq. mm., and it may vary from 0.01 to 100, preferably from 0.1 to 2, joules/sq. mm. Depending on the laser device, these energies may be obtainable without focusing, but it will be understood that focusing may be employed as desired.

Having chosen the size of a desired bonded area or spot, the method then generally involves moving the films relatively to the beam in order to secure continuous bonding. Continuous bonding is possible even with a pulsed laser beam although, as will be understood, the speed of movement of the film is correlated to the frequency of the pulses. For high speed production, a continuous wave ruby laser is preferred. A pulsed wave device is suitable for forming an intermittent bond, e.g., a bonded length wherein the bonded spots or areas are spaced from each other.

As indicated, in the bonded film or other structure it is considered that the bond is the result of a fusion of the mating surfaces of the contiguous structures, although the possibility exists that the bond may in some cases involve more than mere fusion, i.e., the two structure may be chemically united.

The invention may be illustrated by the following examples.

EXAMPLE 1

Two pieces of polyethylene film, each 1 by 2 by 0.018 inch in thickness and having a density of 0.929, were superposed and clamped between a pair of transparent glass plates each having a thickness of 1 mm. The sample was then placed in the optical path of the output beam of a ruby laser so that the plane of the film was perpendicular to the direction of propagation of the output beam. A glass lens having a focal length of 5 cm. was interposed between the laser head and the sample, so that the object distance (laser head to lens) was 14.5 cm. and the image distance (lens to film interface) was 6 cm. A xenon flash lamp, disposed adjacent to the laser rod in an elliptically shaped reflective cavity, was then fired by discharging a bank of capacitors across the lamp. The intense flash of the lamp in turn excited the active atoms of the laser with the result that it produced a pulsed output beam, each pulse lasting for 0.005 second, and having an energy of about 0.25 joule. A strong bond was attained between the films in the irradiated area, the latter comprising about 2.28 sq. mm. Bond strength (or peel strength) was 44.0 g. per mm. width of seal as determined in an Instron Tensile Tester at a cross-head or peeling-apart speed of 0.2 inch per minute.

EXAMPLE 2

Two polyethylene films of 0.916 density, measuring 1 by 2 by 0.002 inch, were taken and exposed to an electric discharge in ammonia gas for 2 seconds. The purpose of this treatment was to form polar groups on the surfaces of the films. The films were then placed together with treated surfaces in contact and irradiated as in Example 1. A bond was formed.

Upon testing of the films in the Instron Tester, a bond strength of 7.2 grams per mm. width was obtained. This value of bond strength relates to a bonded area of 1.5 sq. mm. and involves the peeling apart of the films at a rate of 2.0 inches per minute.

When two identical but untreated contiguous films of 0.916 density were irradiated under the same conditions, no bond was obtained.

EXAMPLE 3

To demonstrate the effect of stretching or orienting, a piece of polyethylene film, density 0.929, measuring 1 by 2 by 0.012 inch, was stretched in the machine direction until its thickness was reduced to 0.006 inch. It was then placed in contact with a non-stretched film specimen of 0.012 inch thickness taken from the same roll as the first piece, and the clamped films were placed in the path of the laser beam, produced as in Example 1, with the stretched film more remote from the laser source and with its direction of orientation perpendicular to the plane of polarization of the beam.

The plane of polarization of the beam is determinable by attenuating the beam with a filter and locating the plane of polarization with a conventional polarizer.

Irradiation of the films produced a bond.

By comparison, two clamped-together untreated films of the same sizes as the foregoing irradiated films were little affected by the beam and were not bonded.

In connection with a focused beam, it may be mentioned that the interface of a pair of structures to be bonded is also disposable beyond the focal plane in a direction remote from the laser source. In other words, not only is such interface disposable in the focal plane, as in FIG. 1a, and between the focal point and the laser source, as in FIG. 2, but also, using FIG. 2 to illustrate, to the right of the focal point 33 where the interface may receive the diverging beam. Thus, where the interface in FIG. 2 receives the converging beam, it may be placed to receive thte diverging beam.

Referring again to FIGS. 3 and 4, it will be understood that the stretched structure can be biaxially oriented.

It will be understood that the invention is capable of obvious variations without departing from its scope.

In the light of the foregoing description, the following is claimed:

1. A method for bonding two thermoplastic resin films together comprising the steps of orienting one of said films by stretching the same in one direction, superimposing one of said films on the other so that at least one pair of mating surfaces form an interface, disposing the direction of orientation of said stretched film perpendicular to the plane of polarization of a radiation source and with the stretched film more remote, from said source, irradiating the interface between said films with electromagnetic radiation emitted from a laser source having a wave length ranging from about 0.2 to about 7.15 microns and thereby selectively absorbing in said interface a quantity of radiation sufficient to bond together said mating surfaces, said absorbed radiation ranging from 0.01 to 100 joules per square mm. of mating surface.

2. Method of claim 1 wherein said one structure is biaxially oriented by stretching the same.

References Cited

UNITED STATES PATENTS

| | | | |
|---|---|---|---|
| 3,175,196 | 3/1965 | Lee et al. | 331—94.5 |
| 3,157,560 | 11/1964 | Livingston et al. | 161—252 |
| 2,622,053 | 12/1952 | Clowe | 156—272 |
| 2,451,597 | 10/1948 | Wheeler | 156—306 |
| 2,845,541 | 7/1958 | Berry | 250—52 |
| 2,968,576 | 1/1961 | Keller | 117—138.8 |
| 3,210,171 | 10/1965 | MacDonald | 65—43 |
| 3,090,717 | 5/1963 | Raczynski et al. | 156—272 |
| 3,187,982 | 6/1965 | Underwood et al. | 161—402 |
| 3,217,088 | 11/1965 | Steierman | 219—121L |
| 3,226,527 | 12/1965 | Harding | 219—384 |

ROBERT F. BURNETT, Primary Examiner

R. J. ROCHE, Assistant Examiner

U.S. Cl. X.R.

156—272, 306; 161—252, 402; 331—94.5